Dec. 6, 1966    S. FLANDERS    3,289,611
LIGHTWEIGHT PORTABLE CHAIR
Filed Aug. 16, 1965
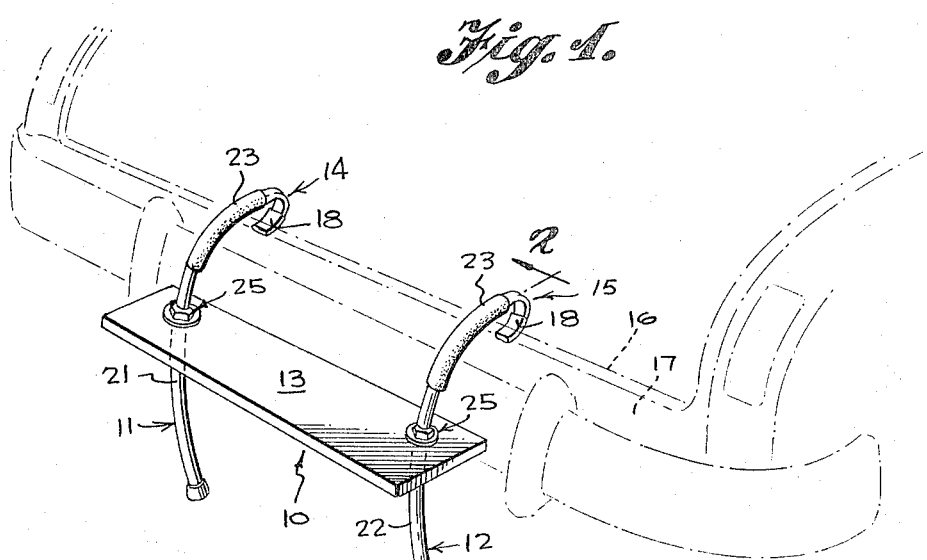
Fig. 1.
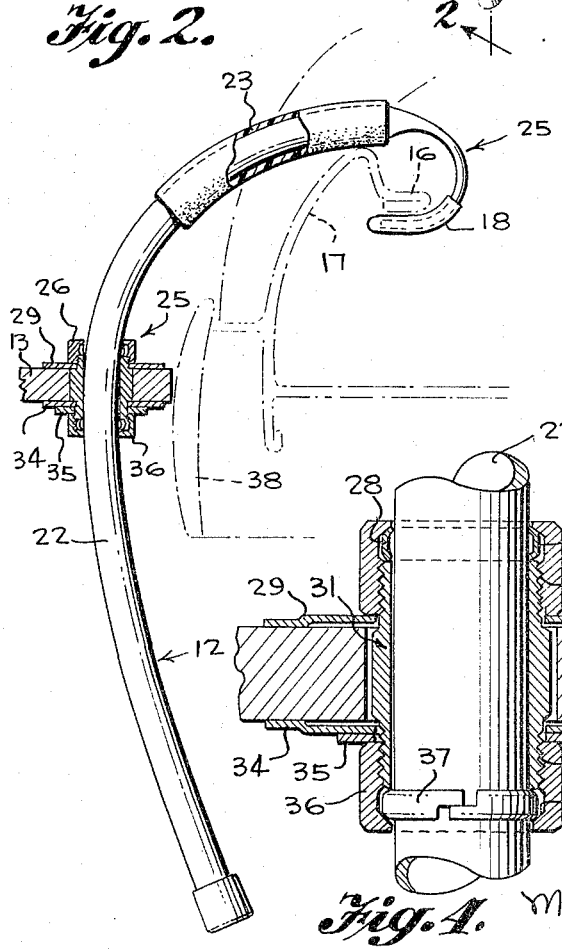
Fig. 2.
Fig. 4.
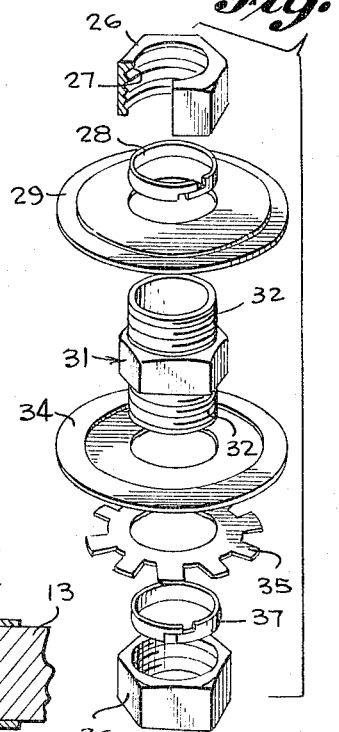
Fig. 3.
INVENTOR
STUART FLANDERS
BY Mason, Fenwick & Lawrence
ATTORNEYS

3,289,611
LIGHTWEIGHT PORTABLE CHAIR
Stuart Flanders, 2213 Main St., Little Rock, Ark.
Filed Aug. 16, 1965, Ser. No. 479,802
2 Claims. (Cl. 108—44)

The present invention relates in general to lightweight portable chairs, and more particularly to a portable chair especially adapted to be used in conjunction with the exterior of an automobile and positioned thereon at desired times so that sportsmen or other persons may be seated to easily change shoes and the like.

Therefore, an object of the present invention is the provision of a lightweight portable chair for use in conjunction with an automobile.

Another object of the present invention is the provision of a lightweight portable chair providing a convenient seating place and adapted to be mounted in detachable relation upon the exterior of an automobile and especially that portion of the automobile comprising the upper edge of the lower trunk opening.

Yet another object of the present invention is the provision of a lightweight portable chair for use in conjunction with an automobile and so constructed that it is readily adjustable to fit the vast majority of automobiles.

A still further object of this invention is the provision of a lightweight portable chair for use in conjunction with automobiles which may be of simple construction, strong, durable and may be manufactured at low cost.

Other objects, advantages and capabilities of the invention will become apparent from the following description taken in conjunction with the accompanying drawings showing only a preferred embodiment of the invention.

In the drawings:

FIGURE 1 is a perspective view of the lightweight portable chair of the present invention shown in operable relation with the rear portion of an automobile.

FIGURE 2 is a vertical section view taken along lines 2—2 of FIGURE 1;

FIGURE 3 is an exploded perspective view of the adjustable friction means for interlocking the seat portion of the chair to the main supports; and FIGURE 4 is a view similar to that of FIGURE 2; however showing greater detail of the adjustable friction means for interlocking the seat to the main supports.

Referring to the drawings wherein like reference characters designate corresponding parts throughout the several figures, the lightweight portable chair of the present invention is generally indicated by the numeral 10. The chair 10 comprises a pair of spaced apart, vertically elongated, curvilinear inverted J shaped side supports 11, 12. Spanning the distance between the side supports 11, 12 is a seat member 13 for maintaining the supports at a predetermined horizontal spacing.

Each of the side support members 11, 12 have a reentrant hook member 14, 15 respectively which is so designed that upon the majority of automobiles the hook will fit around the trunk lip 16 of the automobile trunk 17. In order to prevent marring of the automobile finish, each of the hook members 14, 15 are provided with a protective cover end 18. In addition, the shank portion 21, 22 of the side support members 11, 12 are each provided with a protective sleeve 23 also for the purposes of preventing marring of the automobile finish. As can be seen from FIGURES 1 and 2, the protective ends 18 of the hooks and the protective sleeve 23 of the side support members are positioned at contact points between the automobile and the chair 10.

The seat 13 may be of any suitable material having sufficient strength to accomplish the results intended, and has near its opposite ends, a pair of apertures 24. The apertures 24 are each large enough to accept, in sliding relation, the tubular supports 11, 12 in addition to a portion of the adjustable friction lock 25.

The adjustable friction lock generally surrounds the tubular support member and, in the present invention, it is desired that each support member be equipped with a friction lock 25 so that the seat 13 may be readily adjustable. Comprising the lock 25 is an upper compression nut 26 being internally threaded and having at its top most internal portion a bevelled edge 27. An upper compression split ring 28 is designed to be received within the upper nut 26 and to rest against the bevelled edge 27. Immediately below the upper compression nut 26 is an upper support washer 29 which is designed to engage the top surface of the seat 13. Located within the apertures 24 of the seat 13 is a coupling nut 31 which is externally threaded at each end as noted by numeral 32. The center of the coupling nut 31 has a support shoulder 33 which limits the spacing between the upper support washer 29 and an identical lower support washer 34 so as to correspond with the thickness of the seat 13. Immediately beneath the lower support washer 34 is a lock washer 35 to maintain the friction lock 25 in the desired state of compression.

Below the lock washer 35 is a lower compression nut 36 which is identical to the upper compression nut 26 and is equipped with internal threads and a bevelled edge 27. The nut 26 and the bevelled edge 27 receive the lower compression split ring 37.

Since all of the parts comprising the adjustable friction lock 25 are adapted to be in slidable relation with the slide support members 11, 12, it is easily seen that the seat 13 will be readily adjustable. In operation of the present invention, the user will engage the hooks 14, 15 about the upper edge of the lower trunk opening 16 and then adjust the seat 13 so that its rear portion rests against the automobile bumper 31. At this time the upper and lower compression nuts 26, 36 respectively, will be tightened down upon the threaded ends 32 of the coupling nut 31. This reduces the diameter of the split rings 28 and 37 so as to cause the rings to tighten against the side support members 11, 12. The tightening action is accomplished by having the extreme ends of the coupling nut 31 impinge against one side of the split rings 28 and 37 and the bevelled edges 27 to impinge against the remaining slide of the split rings. The tightening of the compression nuts 26 and 36 causes the bevelled edges 27 to reduce the diameter of the split rings thereby frictionally engaging the side support members so as to prevent the seat 13 from moving vertically along the support members. If it is desired to readjust the seat 13, it is a simple matter to loosen the friction lock 25, move the seat 13 to the desired location and then clampingly engage the friction locks with the side support member in the manner just described.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A lightweight portable chair adapted to be used in conjunction with a supporting structure comprising, a pair of tubular, spaced apart vertically elongated, curvilinear, inverted J-shaped side supports; each support having at one end thereof a reentrant hook member, a seat spanning the distance between the side supports thereby maintaining the supports in parallel planes at a predetermined horizontal spacing, the seat being capable of adjustment along the length of the supports, the seat having a pair of apertures therein, the tubular supports adapted to be received in sliding relation within the apertures, adjustable frictional means interlocking the seat to the supports for maintaining the seat in a predetermined desired location along the supports, and the reentrant hook member adapted to engage the supporting structure for suspending the chair in operable relation therewith.

2. A lightweight protable chair adapted to be used in conjunction with a supporting structure comprising, a pair of tubular, spaced apart vertically elongated, curvilinear, inverted J-shaped side supports; each support having at one end thereof a reentrant hook member, a seat spanning the distance between the side supports thereby maintaining the supports in parallel planes at a predetermined horizontal spacing, the seat being capable of adjustment along the length of the supports, the seat having a pair of apertures therein, the tubular supports adapted to be received in sliding relation within the apertures, adjustable frictional means interlocking the seat to the supports for maintaining the seat in a predetermined desired location along the supports, the frictional means including an adjustable compression fitting adapted to clampingly engage the seat to the supports, the tubular supports being received in sliding relation within the compression fitting for relative movement therewith, and the reentrant hook member adapted to engage the supporting structure for suspending the chair in operable relation therewith.

References Cited by the Examiner

UNITED STATES PATENTS

| 893,930 | 7/1908 | Lederman | 108—47 X |
| 1,925,523 | 9/1933 | Cuff | 211—88 |
| 2,131,214 | 9/1938 | Bentz | 108—47 X |
| 2,142,263 | 6/1939 | Bentz | 108—47 X |
| 2,698,048 | 12/1954 | Schweizer | 248—214 |
| 2,856,251 | 10/1958 | Garrison | 108—44 |

FRANK B. SHERRY, *Primary Examiner.*

G. O. FINCH, *Assistant Examiner.*